Sept. 5, 1961 H. BENMUSSA ET AL 2,999,132

IDENTIFYING SYSTEM

Filed June 11, 1959 3 Sheets-Sheet 1

Inventors
H.Benmussa-
A.Mingaud
By Robert Harding Jr.
Attorney

Sept. 5, 1961 H. BENMUSSA ET AL 2,999,132

IDENTIFYING SYSTEM

Filed June 11, 1959 3 Sheets-Sheet 2

| CODE | | |
|---|---|---|
| 0 | B | D |
| 1 | A | E |
| 2 | B | E |
| 3 | A | B |
| 4 | C | E |
| 5 | A | C |
| 6 | B | C |
| 7 | C | D |
| 8 | D | E |
| 9 | A | D |

*Inventors*
H.Benmussa-
A.Mingaud

By

*Attorney*

Inventors
H. Benmussa-
A. Mingaud
By Robert Harding Jr.
Attorney

United States Patent Office 2,999,132

Patented Sept. 5, 1961

2,999,132

IDENTIFYING SYSTEM

Henri Benmussa, Meudon, and Andre Mingaud, Paris, France, assignors to International Standard Electric Corporation, New York, N.Y., a corporation of Delaware Filed June 11, 1959, Ser. No. 819,733
Claims priority, application France July 11, 1958
5 Claims. (Cl. 179—18)

The present invention concerns improvements to systems for identifying a great number of elements and, more particularly, to such systems using electronic parts.

In connection with various technics, it is necessary to identify one element among a number of elements, this element being distinguished by a voltage applied at a determined point. For instance, in automatic telephone systems, the calling subscriber must be identified for tariff charge or other purposes. To this end a wire is assigned to each subscriber of the exchange which characterizes his number and a voltage is applied on this wire when the corresponding subscriber is calling. A coded information corresponds to each subscriber's number and may be expressed by the energization of different relays or analogous units. It is necessary that the wire which characterizes the element to be identified be connected to a number of wires corresponding to the coded information assigned to the said element.

The identifying circuits meet with a number of problems; in particular the multipling between their different stages and a great number of elements must be made easily realizable; so it is necessary to introduce some convenient decoupling arrangements in series with each of the said elements. Of course, rectifiers may be used, but this is very expensive when the number of elements which are to be identified is large.

According to a feature of the invention, a great number of elements is arranged in a matrix in which each of the said elements may have access to a row wire and to a column wire by means of a simple resistor and in which the marking of a point in the said matrix controls the operation of low-impedance identifying circuits having several stages of amplification which are successively conducting and in which the last stage may indicate the information relating to the identity of the element which has been marked.

As above mentioned, each element to be identified is connected to a row wire and to a column wire; if the reference corresponding to one element comprises K symbols, a row wire, for instance, allows the identification of L symbols and the column wire allows the identification of K—L symbols.

According to another feature of the invention, a low impedance electronic arrangement is assigned to each row wire and to each column wire, the said electronic arrangement, for instance, a transistor, mounted with the emitter electrode connected to the ground, being representative of L or of K—L symbols of the reference relating to the element to be identified; each of these transistors is multipled, by means of resistors, to L or to K—L transistors comprised in the next stage, and each symbol identified may be indicated according to a code by means of a third stage of transistors which control the operation of relays or analogous systems.

Since each transistor of the second stage may represent a symbol from 0 to 9, there are $10x$ K transistors in this stage.

On the other hand, the operation of the three stages is successively controlled from a convenient marking potential applied to the first stage by means of the identifying matrix.

According to another feature of the invention, the three amplifying stages are constituted with complementary transistors, the operation of the N-P-N transistors of stage $m$, for instance, being controlled by the operation of the P-N-P transistors of the stage $m-1$, such an arrangement permitting the necessary voltages for the control of these successive operations without additional feeding devices.

Lastly, a fault appearing in one of the stages must not cause an error in the identifying operation.

According to another feature of the invention, a convenient resistor is connected in parallel on the input of each transistor in the identifying circuits, such an arrangement avoiding the erroneous marking of the transistors assigned to the same multiple in case of a fault of the said transistor, in order to allow the identifying circuits to operate in a correct manner.

Other features of the invention will become apparent from the following description given as a non-limitative example with reference to the accompanying drawings in which.

Figure 1:
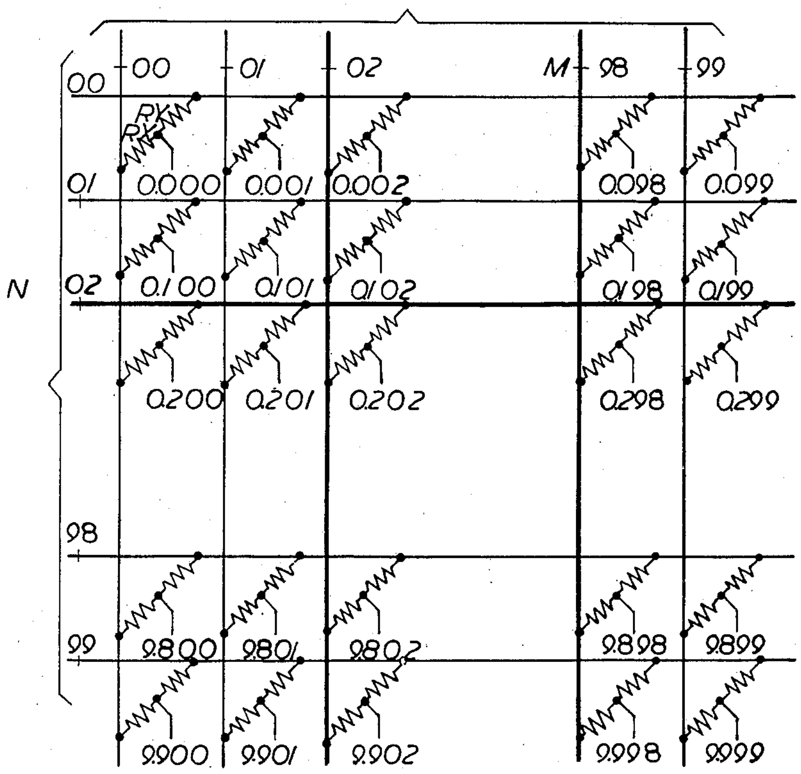
FIG. 1 represents an identifying matrix of 10,000 elements referenced 0000 to 9999.

Each element among 10,000 elements may be characterized by a number from 0000 to 9999. In a matrix, as the matrix shown in FIG. 1, comprising 100 column wires and 100 row wires, each element may be assigned to one column wire and to one row wire, and this element is then characterized by two numbers; each varying from 00 to 99. Thus, for instance, the element which is referenced 0298 is assigned to the column wire M, representing tens 9 and units 8, and to the row wire N, representing thousands 0 and hundreds 2. If the marking of an element is characterized by applying a voltage to a junction point of the matrix, it is obvious that these elements may be decoupled. The electronic units (transistors) used in the identifying circuits, having low input voltages and low control currents, allow the use of low power decoupling resistors, indicated at RX and RY.

It will be assumed, by way of example, that a voltage is applied to the junction point 0298 in order to allow the correspondant element to be identified. This voltage is applied by means of resistors RX and RY respectively to column wire M, designated 98, and row wire N, designated 02. This allows the control of the identifying circuits, as described hereafter with reference to FIG. 2. The circuits allowing the identification of thousands and hundreds are shown in this figure. Those allowing the identification of tens and units are similar and have not been shown. This figure is quite schematic and permits a clear understanding of the following description.

The identifying circuit for the row wire N comprises a plurality of transistors arranged in three groups forming three stages. Each row wire is connected to the base of a transistor of the first stage, such as TR0, TR1, . . . TR99, making 100 transistors the 100 row wires. Since the row wires designate the thousands and hundreds digits of the junction points connected thereto over the resistances RY, all of the transistors connected to row wires having the thousands digit 0 have their collector electrodes multipled to the base of a single transistor TR$m$0 of the second stage. Similarly, all transistors connected to row wires having a thousands digit 1 have their collector electrodes multipled to the base of a single transistor TR$m$1 of the second stage, and so on with the transistors of the first stage which are connected to the row wires having a thousands digit 9 having their collector electrodes connected to the base of a transistor TR*m*9 in the second stage.

Thus, there are 10 transistors in the second stage TR*m*0 to TR*m*9, each of which represents a particular thousands digit.

In addition to the ten transistors TR*m*0 to TR*m*9, there are ten other transistors TR*c*0 to TR*c*9 in the second stage. Each of these transistors has its base multipled to the collector electrodes of corresponding transistors of each group of transistors in the first stage. Thus, transistor TR0 connected to the row wire 00 is coupled to transistor TR*c*0, as are also the transistors connected to the row wires 10, 20 to 90. Similarly, transistor TR*c*9 is coupled to the transistors connected to row wires 09 to 99.

Thus, when a voltage appears on a row wire, a particular transistor of the first stage is energized which will, in turn, energize a transistor TR*m*0 to TR*m*9 of the second stage, which will indicate the thousands digit, and also a transistor TR*c*0 to TR*c*9 in the second stage, which will indicate the hundreds digit.

The junction point 0298, when given a predetermined voltage, will energize the transistor TR2 in the first stage which is connected to the row wire 02. The transistor TR2 in the first stage will then energize the transistors TR*m*0 and TR*c*2 in the second stage, indicating a thousands digit of 0 and a hundreds digit of 2.

The third stage of the thousands and hundreds identifying circuits comprises two sets, each having five transistors; one set is assigned to the thousands "order" and the other to the hundreds "order" and allows the identification of the value according to the code "2 out of 5."

Each transistor of the second stage has its collector electrode multipled to the bases of two transistors of the third stage, and each transistor of the third stage has its base multipled to the collector electrodes of four transistors of the previous stage.

Figure 2:
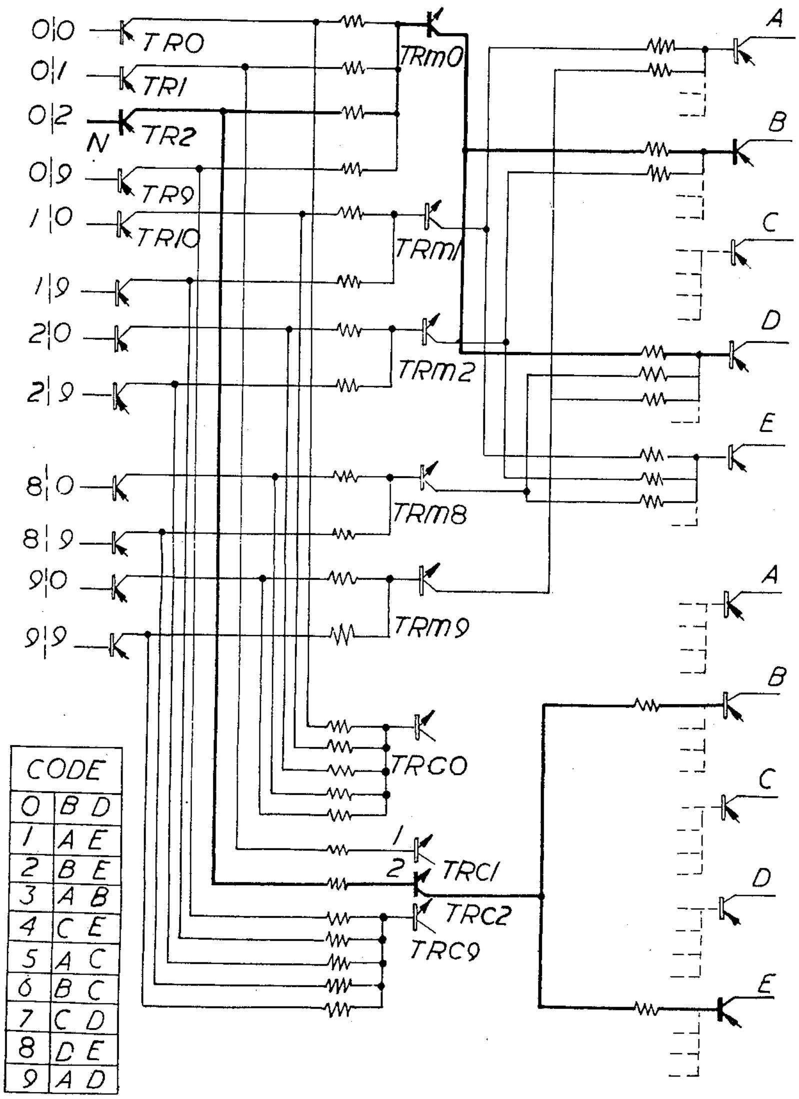
FIG. 2 represents the identifying circuits for thousands and hundreds denominations.

As already stated, the identifying circuit for the tens and units digits is similar to that disclosed in FIG. 2 for the thousands and hundreds digits, and actually the two circuits may be considered as one circuit with 200 transistors on the first stage, 40 transistors in the second stage and 20 transistors in the third stage.

Thus, the principle used in the invention allows the identification of one element among 10,000 by means of an amplifying chain in having three stages comprising only 260 transistors. It is obvious that each stage must be responsive to a number of problems concerning the following: multipling, gain, compensation of temperature.

Figure 3:
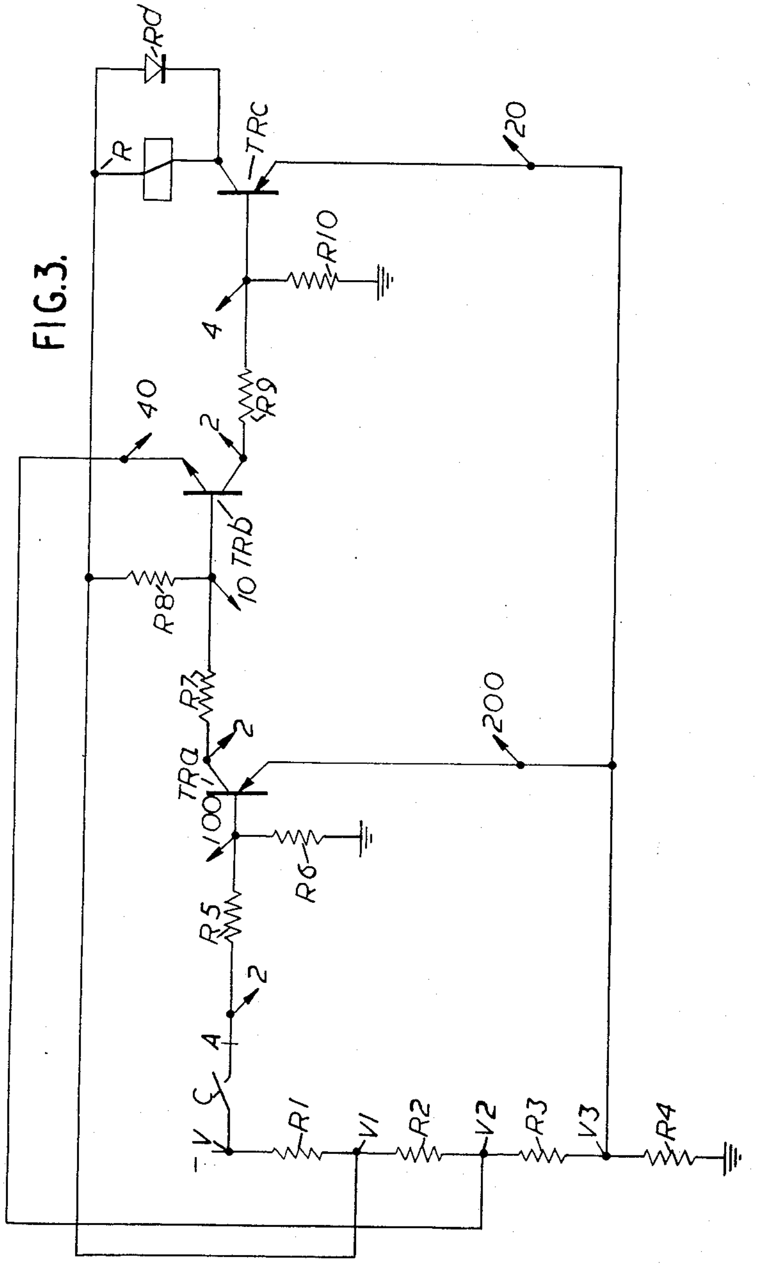
FIG. 3 represents the detailed circuitry of a single chain of the transistors of the identifying circuit.

With reference to FIG. 3, the conditions for the operation of the chain will now be studied. This figure shows the detailed circuitry of one transistor in each stage.

The feeding device of the present arrangement is constituted by a battery or any analogous device, indicated at —V, able to deliver a direct voltage having an appropriate value. A voltage divider comprising series connected resistors R1 to R4 is connected across the device, the volume of the resistors providing convenient bias voltages for the different electrodes of the transistors. The end of the voltage divider adjacent the resistor R4 is connected to ground. The feeding voltage may be varied from the value for energizing the terminal relays to the value corresponding to the maximum current admissible.

Contact C represents a device by which the marking potential from the negative end —V of the voltage divider is applied to one of the junction points in the identifying matrix, indicated at A. This junction point is connected to the base electrode of one of the transistors TR*a* in the first stage assigned to the thousands-hundreds identification, by means of a decoupling resistor R5 which corresponds to one of the resistors RY in FIG. 1. The point A is also connected over a similar resistor corresponding to one of the resistors RX to a transistor in the first stage assigned to the tens-unit identification, as is indicated by the multipling arrow 2. Since each row wire has 100 junction points connected to it over 100 resistors, corresponding to R5, the base of the transistor for that row is connected to these 100 resistors and this is indicated by multipling arrow 100. Further, for a matrix of 10,000 elements, the first stage of the identifying circuits comprises 200 transistors which have the same emitter bias, and this is shown by the multipling arrow 200 in the bias connection to the emitter electrodes.

It is obvious that the possibilities of multipling depend upon the ratio of the marking potential V to the input voltage for the control of the transistors in the first stage. The said input voltage is very low and has a constant value for different gain values varying in the ratio 1 to 3. On the other hand, the current efficiency may be very low in order to increase the possibilities of multipling, but this is limited by the number multipled in order to avoid the use of resistors having a low value and therefore a high wattage, for this is too expensive. The value of the decoupling resistor R5 has been chosen regarding the input impedance of the stage in such a way that this stage may be multipled to a set of 100 elements and provide a suitable efficiency.

Resistor 6 has such a value that the potential of the junction of this resistor and any associated operated transistor in either column or row is of such magnitude that, (1) all transistors in the other group excepting the one associated with the marked point, are precluded from operating, and (2) all other transistors in the same group are precluded from operating.

Each of the transistors of the first stage controls the operation of two transistors of the second stage, as has been mentioned before. It will be noticed that the amplifying circuit has three stages using complementary transistors (the first and the third stage comprise P-N-P transistors, while the second stage comprises N-P-N transistors). Such an arrangement makes the feeding of the chain easier and thus the number of elements is reduced and the cost of manufacture is reduced. Resistor R8 is identical to resistor R6, provided in the first stage of the amplifying circuits; so is resistor R10 in the third stage. Transistor TR*b* of the second stage is multipled to all the transistors assigned to the same digit of a determined order in the previous stage; this transistor is thus multipled to 10 transistors of the first stage, as shown by the multipling arrow, FIG. 3. The second stage of the amplifying circuit thus comprises 40 transistors as indicated by the multipling arrow 40 on the bias connection of transistor TR*b*.

The third stage of amplifying circuit supplies the information corresponding to the different digits of the number which represents the element to be identified; this information is supplied according to the code "2 out of 5," as above mentioned, and leads to the energization of two relays in each of four groups.

Each transistor TR*b* is thus multipled to two transistors TR*c* of the third stage. The decoupling is effected by means of resistor R9; each transistor TR*c* of the third stage is multipled to 4 transistors of the second stage (a code element "2 out of 5" is used four times in order to represent the numbers from 0 to 9, as shown by the table of FIGURE 2.)

So as to ensure the operation of the equipment at a high temperature and to define a threshold of operation for interference and spurious voltages the emitter of each transistor is slightly biassed, as shown in FIG. 3. It must be noticed that this biassing is convenient only for a low base impedance, as in the present case, because of the large amount of multipling.

A negative identifying voltage applied at point A causes transistor TR*a* to conduct, its emitter being at a positive potential regarding the said negative potential. In this case, the collector potential approaches that of ground which causes the N-P-N transistor TR*b* to conduct (because its emitter is negatively biassed). The collector of TR$b$ now assumes a negative potential, as does also the base electrode of transistor TR$c$ which is caused to conduct, causing the coding relay R to operate.

It will be noticed that relay R is shunted by a rectifier R$d$ in order to avoid damage to the transistor when the current is broken in the circuit. On the other hand, the ratio of the control current of the relay to the input current of the amplifying circuit is not very important, and therefore the current gain in each stage may be low. Further, the delay for the operation of the marking relays ahead of the matrix is important enough to allow the use of transistors having a very low cut-off frequency. In short, it is not necessary to hold the transistors which are used for this equipment to close limits of manufacture.

It is obvious that the foregoing has been described as a non-limitative example and that various embodiments may be envisaged without departing from the scope of the invention. It is possible to realize this equipment with any trigger elements instead of transistors. The present invention may be applied to telephonic systems, for the identification of the subscribers, for instance, as well as to different transmission technics, as computers, statistical purposes, etc.

It is also possible to utilize these circuits with only the first two stages, since these two stages permit identification of an element according to decimal form.

What is claimed is:

1. A circuit for identifying a marked one of a plurality of points arranged in a coordinate array comprising a plurality of row wires divided into groups, there being one row wire for each row of points, a first resistor at each point in a row connecting said point to said row wire, a plurality of column wires divided into groups there being one column wire for each column of points, a second resistor at each point in a column connecting said point to said column wire, an amplifying circuit comprising at least two stages of amplifying devices, there being one amplifying device in said first stage for each row wire and one for each column wire and a plurality of amplifying devices in said second stage, means for respectively coupling said first stage devices to said wires so as to cause the device coupled to a wire to become conducting when a point connected to said wire over one of said resistors has been marked by the application of a predetermined potential, and means for coupling each device of the first stage to two devices of said second stage, one to represent the group of the wire to which said device is coupled and the other to represent the position of said wire in the group.

2. A circuit for identifying a marked one of a plurality of points arranged in a coordinate array, as defined in claim 1, in which the amplifying devices are transistors.

3. A circuit for identifying a marked one of a plurality of points arranged in a coordinate array, as defined in claim 2, in which the amplifying circuit further comprises a third stage of amplifying devices, and means for coupling each device of the second stage to two devices of the third stage in accordance with a 2-out-of-5 code.

4. A circuit for identifying a marked one of a plurality of points arranged in a coordinate array, as defined in claim 3, in which the transistors in the first and third stages are of the P-N-P type and those of the second stage are of the N-P-N type.

5. A circuit for identifying a marked one of a plurality of points arranged in a coordinate array, as defined in claim 1, in which the amplifying circuit further comprises a third stage of amplifying devices, and means for coupling each device of the second stage to two devices of the third stage in accordance with a 2-out-of-5 code.

References Cited in the file of this patent

UNITED STATES PATENTS

| | | |
|---|---|---|
| 2,749,387 | Barlow et al. | June 5, 1956 |
| 2,857,470 | Faulkner | Oct. 21, 1958 |